United States Patent
Shin et al.

(10) Patent No.: US 8,830,888 B2
(45) Date of Patent: Sep. 9, 2014

(54) METHOD AND SYSTEM FOR WIRELESS CHARGING USING RADIO WAVE

(75) Inventors: Young-Shik Shin, Suwon-si (KR); Dae-Hyun Sim, Seoul (KR); Chang-Seok Lee, Cheonan-si (KR); Beom-Soo Cho, Seongnam-si (KR); Hyun-Soo Kim, Hwaseong-si (KR); Se-Yeon Kim, Seongnam-si (KR)

(73) Assignee: Samsung Electronics Co,. Ltd., Suwon-si (KR)

( * ) Notice: Subject to any disclaimer, the term of this patent is extended or adjusted under 35 U.S.C. 154(b) by 236 days.

(21) Appl. No.: 13/112,794

(22) Filed: May 20, 2011

(65) Prior Publication Data

US 2011/0286374 A1 Nov. 24, 2011

(30) Foreign Application Priority Data

May 20, 2010 (KR) ........................ 10-2010-0047254

(51) Int. Cl.
*H04W 4/00* (2009.01)

(52) U.S. Cl.
USPC ........... 370/311; 370/328; 370/330; 370/336; 370/480; 455/422.1; 455/432.1; 455/432.3

(58) Field of Classification Search
USPC ......... 370/328–331, 336–339, 341–345, 437, 370/480–482, 491; 455/412, 168.1, 188.1, 455/418, 422.1, 432.1, 432.3
See application file for complete search history.

(56) References Cited

U.S. PATENT DOCUMENTS

| 2007/0278998 | A1 | 12/2007 | Koyama |
| 2008/0272889 | A1 | 11/2008 | Symons |
| 2010/0034108 | A1 | 2/2010 | Ode |
| 2010/0036773 | A1* | 2/2010 | Bennett .......................... 705/67 |
| 2010/0157399 | A1* | 6/2010 | Kroll et al. ...................... 359/11 |
| 2011/0175461 | A1* | 7/2011 | Tinaphong ................... 307/149 |

FOREIGN PATENT DOCUMENTS

JP 2009524398 A 6/2009

OTHER PUBLICATIONS

International Search Report dated Feb. 10, 2012 in connection with International Patent Application No. PCT/KR2011/003705.
Written Opinion of the International Searching Authority dated Feb. 10, 2012 in connection with International Patent Application No. PCT/KR2011/003705.

* cited by examiner

*Primary Examiner* — Kibrom T Hailu
*Assistant Examiner* — Zewdu A Beyen

(57) ABSTRACT

A method and system for wireless charging using a radio wave. The method includes scanning a radio wave of an access point, determining an available charging frequency band among frequency bands, sending the access point a request for transmitting a charging radio wave at the charging frequency band, and switching power output from an antenna, to a battery circuit.

10 Claims, 2 Drawing Sheets

METHOD AND SYSTEM FOR WIRELESS CHARGING USING RADIO WAVE

CROSS-REFERENCE TO RELATED APPLICATION(S) AND CLAIM OF PRIORITY

This application is related to and claims priority under 35 U.S.C. §119(a) to a Korean Patent Application filed in the Korean Intellectual Property Office on May 20, 2010 and assigned Serial. No. 2010-0047254, the contents of which are herein incorporated by reference.

TECHNICAL FIELD OF THE INVENTION

The present invention relates to a system for wireless charging an electronic device using a wireless connectivity technology. More particularly, the present invention relates to a radio wave system for wireless power transmission/reception.

BACKGROUND OF THE INVENTION

One of the known technologies related to the present invention is a technology for converting power energy obtained through solar electricity generation in space, into a microwave and transmitting the microwave to a specific point of the ground. This technology is applied to the development of a technology for supplying electric energy necessary for a light aircraft and the like.

These technologies are schemes for converting power energy itself only into a microwave and transmitting/receiving the microwave, and are used for transmitting a large capacity of power obtained from space, to the ground. Here, the used converted microwave is of a linear type close to light and has a disadvantage that it is available within a visible distance only. Also, the converted microwave has a limitation of a wireless distance range, needs separate transmission/reception devices and base station or relay station construction, and has a disadvantage that its use is restricted to a special use.

SUMMARY OF THE INVENTION

An aspect of the present invention is to substantially solve at least the above problems and/or disadvantages and to provide at least the advantages below. Accordingly, one aspect of the present invention is to provide a method and system for supplying more stable and continuous power energy even without separate battery charging in using at least these mobile devices, by loading or including a source-natured radio wave converting power into a radio wave, on or in a common wideband or narrowband data transmission/reception radio wave or carrier having the generality used for several uses in a mobile communication device, modulating the source-natured radio wave, and transmitting/receiving the modulated radio wave.

The above aspects are achieved by providing a method and system for wireless charging using a radio wave.

According to one aspect of the present invention, a method for wireless charging an electronic device using a radio wave is provided. The method includes scanning a radio wave of an access point. The method also includes determining an available charging frequency band among frequency bands. The method further includes sending the access point a request for transmitting a charging radio wave at the charging frequency band. The method still further includes switching power output from an antenna, to a battery circuit.

The radio wave may be associated with a wireless Local Area Network (LAN). Further, the charging radio wave may set binary data to a value comprising a succession of '1'. Further, if the charging of the electronic device is completed, the above charging circuit may switch a signal output from the antenna, to a decoding circuit.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF THE INVENTION

Figure 1:
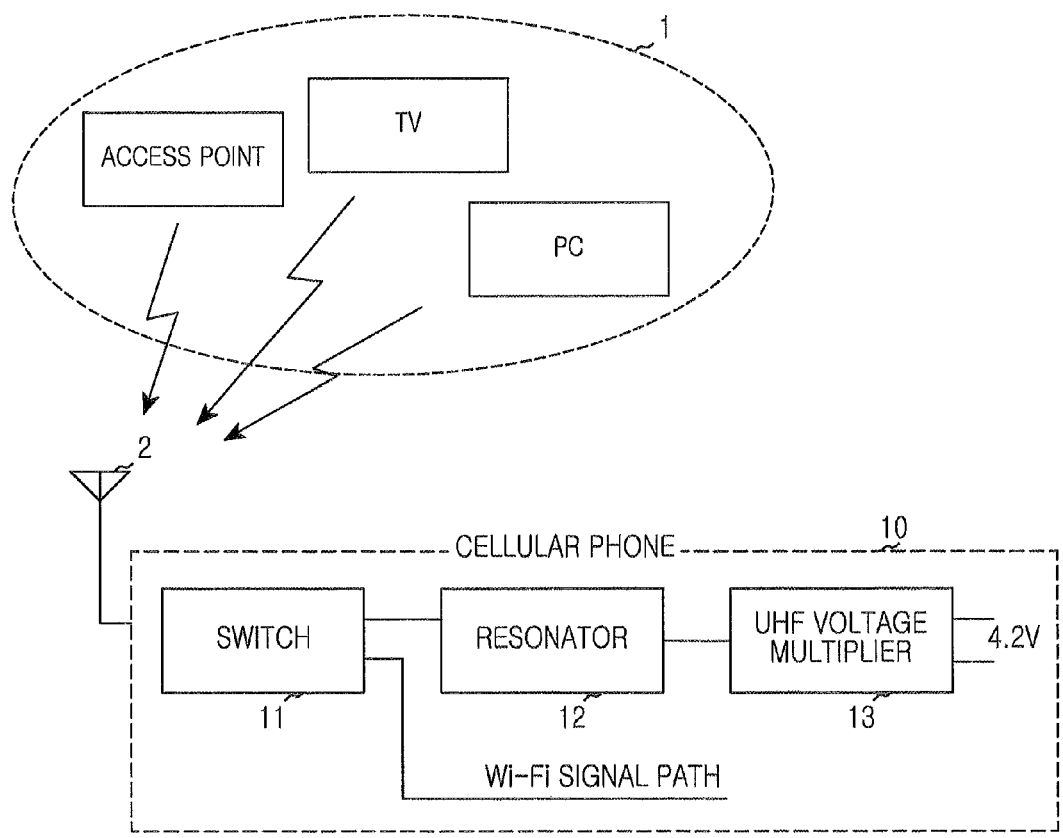
FIG. 1 illustrates a system for wirelessly charging a terminal using a wireless Local Area Network (LAN)
Figure 2:
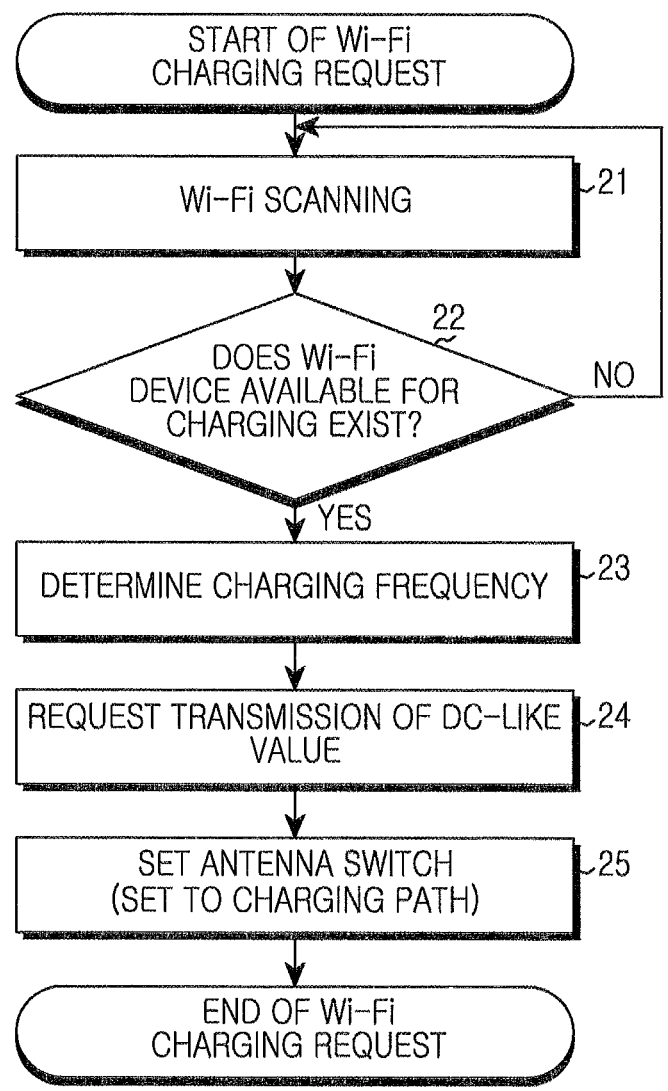
FIG. 2 illustrates a method for wirelessly charging through a wireless LAN in a terminal.

FIGS. 1 and 2, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, can be different depending on user and operator's intention or practice. Therefore, the terms should be defined on the basis of the disclosure throughout this specification.

Exemplary embodiments of the present invention provide a radio wave system apparatus and method for wireless power transmission/reception, capable of continuously transmitting/receiving power in a wireless scheme without limitation even when there is not a separate power supplying device in a corresponding device. After converting power energy into a source-natured radio wave form, the wireless power is transmitted/received by loading or including an electric source necessary for use and operation of various electronic devices on or in a unique dedicated radio wave or a different-scheme radio wave used in a corresponding device, modulating the electric source, and transmitting/receiving the modulated electric source. Here, the various electronic devices may include all of various mobile communication devices including a cellular phone using a battery, a wireless Internet terminal, a smart phone, a Portable Digital Assistant (PDA), a mobile computer inclusive of a notebook computer, a laptop computer, a palmtop computer, a portable printer, various portable audio/video devices inclusive of a radio set, a MPEG Audio Layer-3 (MP3) player, a cassette, a public TeleVision (TV), a portable card checker, an electric car, an electric bicycle, an electric scooter, an electric boat, a robot, a plaything, a tool, a speed camera, a camcorder, an aircraft, a spaceship, an artificial satellite, and other mobile device using a battery as a main electric source or various devices for an area or place difficult to install an electric wire and the like.

In a mobile communication device such as a cellular phone and the like, the fact that a battery use time is restricted in spite of the development of a new battery technology is one of the difficult problems to solve.

Exemplary embodiments of the present invention present a wireless power supply scheme for solving a conventional restriction of a use time of a battery and further, applying a common radio wave system capable of continuously supplying power.

FIG. 1 is a block diagram illustrating a system for wirelessly charging a terminal using a wireless Local Area Network (LAN).

Referring to FIG. 1, the terminal 10 includes an antenna 2 for receiving a wireless LAN 1, a switch 11 for distinguishing a wireless LAN signal and a charging signal and switching a path, a resonator 12 for changing matching according to a specific frequency and extracting a Direct Current (DC) component, and a voltage multiplier 13 for multiplying the extracted DC to a main electric source of the terminal 10. An output of the multiplier 13 is used as a charging voltage of the terminal 10.

Although not illustrated in FIG. 1, the terminal 10 includes a controller for controlling and processing general operation. That is, the controller controls and processes a function for scanning a wireless LAN to search for neighboring wireless LAN devices. The controller distinguishes each searched wireless LAN device as either a device currently in use or a device available for charging, and determines if a device available for charging exists. Also, when the scanning result is that a wireless chargeable access point exists, the controller determines a charging frequency and requests the transmission of a DC-like radio wave. The controller controls a function for setting binary data to a maximum value to transmit charging energy and transmitting the binary data. Also, the controller controls a switching operation of the switch 11 and provides an output coming from the antenna 2 to a battery circuit or a decoding circuit.

FIG. 2 is a flowchart illustrating a method for wireless charging through a wireless LAN in a terminal.

Referring to FIG. 2, in step 21, the terminal scans a wireless LAN to search for neighboring wireless LAN devices. In step 22, the terminal distinguishes each searched wireless LAN devices as either a device currently in use or a device available for charging, and determines if the device available for charging exists. Here, the terminal may determine, as a wireless chargeable access point, a device currently not in use among the neighboring wireless LAN devices.

When the scanning result is that the wireless chargeable access point exists, in step 23, the terminal determines a charging frequency. In this step, the terminal determines a usable frequency among wireless LAN frequency bands and uses the determined charging frequency.

After that, in step 24, the terminal requests the transmission of a DC-like radio wave, and transmits binary data as a maximum value to transmit charging energy. That is, the terminal sets the binary data to '1111 . . . 11' such as a DC value, and transmits the set binary data.

Next, in step 25, the terminal switches a switch to provide an output coming from an antenna, to a battery circuit. In a system construction of FIG. 1, a switch 11 includes a function of switching a wireless LAN signal path and a charging path and, in a charging mode, the switch 11 switches a wireless LAN signal to the charging path and inputs the wireless LAN signal to a charging circuit. Here, if the charging is completed, the terminal may switch the switch 11 and provide a signal output from the antenna, to a Wireless-Fidelity (Wi-Fi) signal path.

A wireless charging system according to the present invention fundamentally solves a conventional temporal and spatial restriction in supplying power energy necessary for use or operation of a mobile communication device, a PDA, a portable audio/video device, a public TV, a mobile computer, an electric car, an electric bicycle, a robot, a plaything, a tool, a cleaner, a camcorder, a train, a ship, an aircraft, a spaceship, an artificial satellite, another mobile device using a battery and the like. The wireless charging system has an advantage of decreasing or omitting battery devices of these devices to make additional lightweight, slimness, and simplification of a mobile device possible and also, being capable of continuously supplying power in a wireless scheme and being capable of transmitting, as long as a radio wave reaches, power even to a distant place in the wireless scheme, thus not suffering a restriction of an electric source in a place and time of use of various mobile devices.

Also, exemplary embodiments of the present invention have an advantage in which a transmission station may use cheap night electricity because DC-form power used in the present invention may be stored, an unnecessary waste of power is prevented because electricity is supplied in a wireless scheme according to a power energy request signal of a mobile device, and existing frequency band, transmission system and facilities such as a base station, a relay station and the like may be used as it is as devices or facilities of a wireless power transmission system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for wirelessly charging an electronic device using a radio wave, the method comprising:
searching for a plurality of neighboring devices by scanning wireless Local Area Network (WLAN) frequency bands;
identifying a subset of neighboring devices that are not in use from the searched plurality of neighboring devices;
selecting a neighboring device among the identified subset of neighboring devices;
determining a charging frequency band based on the selected neighboring device;
sending the selected neighboring device a request for transmitting a charging radio wave at the determined charging frequency band;
switching a power output of an antenna to a battery circuit;
receiving the charging radio wave on the charging frequency band by the antenna; and
if the charging of the electronic device is completed, switching a signal output from the antenna to a signal processing circuit.

2. The method of claim 1, wherein the charging radio wave includes binary data comprising a succession of values set to '1'.

3. The method of claim 1, wherein the charging radio wave includes a direct current (DC) component.

4. The method of claim 1, wherein the electronic device is one of a cellular phone using a battery, a wireless Internet terminal, a smart phone, a Portable Digital Assistant (PDA), a mobile computer inclusive of a notebook computer, a laptop computer, a palmtop computer, or a portable printer.

5. The method of claim 1, wherein the electronic device is one of a radio set, a MPEG Audio Layer-3 (MP3) player, a cassette, a television (TV), a portable card checker, an electric car, an electric bicycle, an electric scooter, an electric boat, a robot, a plaything, a tool, a speed camera, a camcorder, an aircraft, a spaceship, or an artificial satellite.

6. An apparatus configured to wirelessly charge an electronic device using a radio wave, the apparatus comprising:
a controller configured to:
search for a plurality of neighboring devices by scanning wireless Local Area Network (WLAN) frequency bands;
identify a subset of neighboring device that are not in use from the searched plurality of neighboring devices;
select a neighboring device among the identified subset of neighboring devices;
determine a charging frequency band based on the selected neighboring device;
send the selected neighboring device a request for transmitting a charging radio wave at the determined charging frequency band; and
switch a power output of an antenna to a battery circuit,
wherein the antenna is configured to receive the charging radio wave on the charging frequency band and wherein, if the charging of the electronic device is completed, a signal output from the antenna is switched to a signal processing circuit.

7. The apparatus of claim 6, wherein the charging radio wave includes binary data comprising a succession of values set to '1'.

8. The apparatus of claim 6, wherein the charging radio wave includes a direct current (DC) component.

9. The apparatus of claim 6, wherein the electronic device is one of a cellular phone using a battery, a wireless Internet terminal, a smart phone, a Portable Digital Assistant (PDA), a mobile computer inclusive of a notebook computer, a laptop computer, a palmtop computer, or a portable printer.

10. The apparatus of claim 6, wherein the electronic device is one of a radio set, a MPEG Audio Layer-3 (MP3) player, a cassette, a television (TV), a portable card checker, an electric car, an electric bicycle, an electric scooter, an electric boat, a robot, a plaything, a tool, a speed camera, a camcorder, an aircraft, a spaceship, or an artificial satellite.

* * * * *